United States Patent
Wanami et al.

(10) Patent No.: US 7,690,679 B2
(45) Date of Patent: Apr. 6, 2010

(54) PASSENGER-PROTECTING SYSTEM FOR AUTOMOTIVE VEHICLE

(75) Inventors: Shingo Wanami, Kariya (JP); Kazuhisa Hashimoto, Kariya (JP)

(73) Assignee: Denso Corporation, Kariya (JP)

( * ) Notice: Subject to any disclaimer, the term of this patent is extended or adjusted under 35 U.S.C. 154(b) by 580 days.

(21) Appl. No.: 11/598,858

(22) Filed: Nov. 14, 2006

(65) Prior Publication Data

US 2007/0114770 A1 May 24, 2007

(30) Foreign Application Priority Data

Nov. 21, 2005 (JP) .............................. 2005-336089

(51) Int. Cl.
*B60R 21/0136* (2006.01)

(52) U.S. Cl. ...................................... 280/735

(58) Field of Classification Search ................ 280/271, 280/274, 735; 701/45; 180/271, 274
See application file for complete search history.

(56) References Cited

U.S. PATENT DOCUMENTS

| | | | | |
|---|---|---|---|---|
| 5,322,323 A * | 6/1994 | Ohno et al. | ............... | 280/730.2 |
| 5,338,062 A * | 8/1994 | Kiuchi et al. | ................ | 280/735 |
| 5,390,951 A * | 2/1995 | Iyoda | ....................... | 280/730.2 |
| 5,538,099 A * | 7/1996 | Blackburn et al. | .......... | 180/282 |
| 5,748,075 A * | 5/1998 | Dirmeyer et al. | ............. | 340/436 |
| 5,793,005 A * | 8/1998 | Kato | ..................... | 200/61.45 R |
| 6,553,295 B1 * | 4/2003 | Bauch et al. | ................... | 701/45 |
| 2003/0184066 A1 * | 10/2003 | Stierle | .......................... | 280/735 |
| 2004/0182627 A1 * | 9/2004 | Bujak | ........................... | 180/274 |
| 2005/0269809 A1 * | 12/2005 | Gaukel et al. | ................ | 280/735 |
| 2006/0095183 A1 | 5/2006 | Schuller et al. | | |

FOREIGN PATENT DOCUMENTS

| | | |
|---|---|---|
| DE | 692 06 086 | 4/1996 |
| DE | 196 08 180 | 2/1997 |
| DE | 103 60 823 | 7/2005 |
| DE | 10 2004 005 491 | 8/2005 |
| JP | 02-249740 | 10/1990 |
| JP | 08-324379 | 12/1996 |

OTHER PUBLICATIONS

Office Action dated May 30, 2007 in German Application No. 10 2006 046 971 with English translation.

* cited by examiner

Primary Examiner—Faye M. Fleming
Assistant Examiner—Robert A Coker
(74) Attorney, Agent, or Firm—Harness, Dickey & Pierce, PLC

(57) ABSTRACT

A passenger-protecting system includes a pressure sensor for detecting a pressure in an inner space of a door and a side airbag installed in the door. The pressure in the inner space increases when a side collision occurs. When the pressure in the inner space of the door exceeds a predetermined threshold level, the side airbag is inflated to protect a passenger from a side collision. There are certain situations where the operation of the side airbag is not necessary even if the pressure in the inner space of the door exceeds the threshold level. Such situations include: when the door is abruptly closed and a front airbag is inflated to protect a passenger from a frontal collision. According to the present invention, unnecessary operations of the side airbag are effectively avoided.

12 Claims, 5 Drawing Sheets

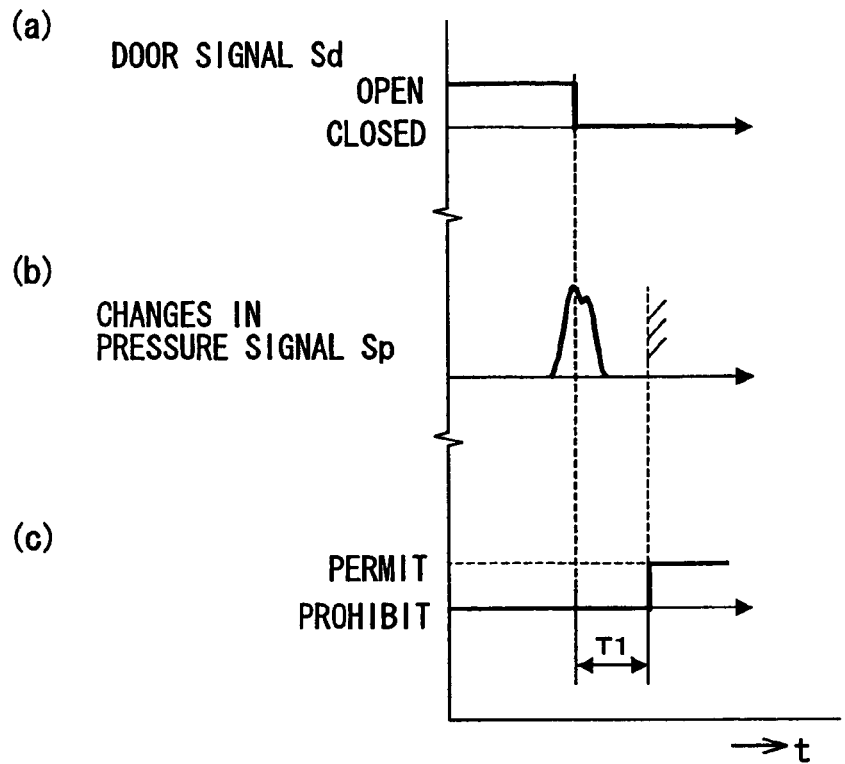
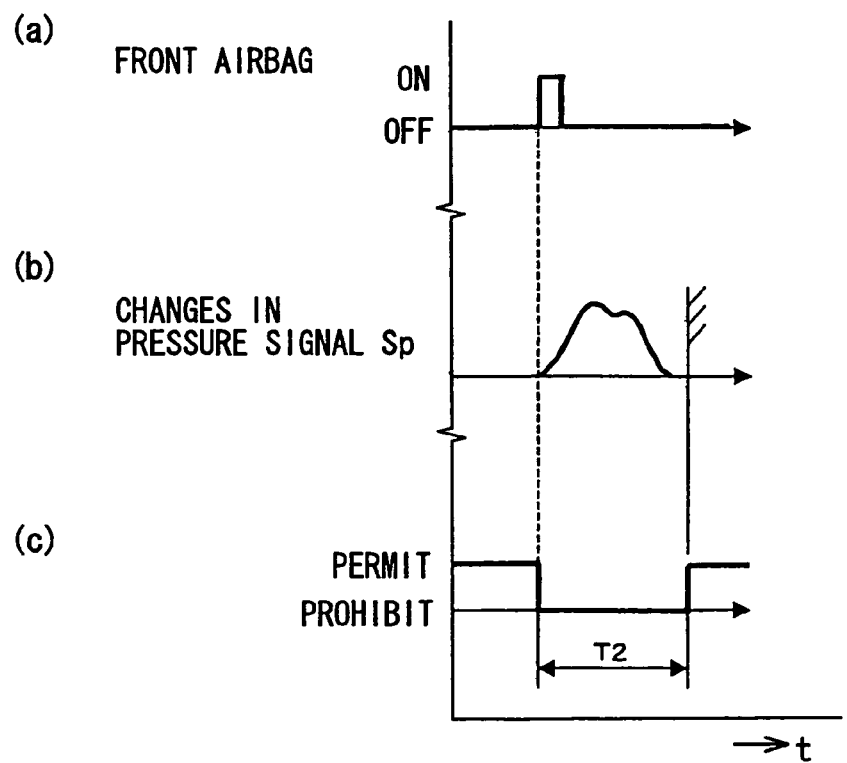

PASSENGER-PROTECTING SYSTEM FOR AUTOMOTIVE VEHICLE

CROSS-REFERENCE TO RELATED APPLICATION

This application is based upon and claims benefit of priority of Japanese Patent Application No. 2005-336089 filed on Nov. 21, 2005, the content of which is incorporated herein by reference.

BACKGROUND OF THE INVENTION

1. Field of the Invention

The present invention relates to a system for protecting a passenger from a side collision of an automotive vehicle.

2. Description of Related Art

A system for protecting a passenger from a side collision (a door of an automobile collides with an obstacle) has been known hitherto. An example of such a system is disclosed in JP-A-2-249740. In this system, a side collision is detected based on pressure changes in an inner space of a door. Namely, it is determined that a side collision occurred when the pressure in the inner space of the door exceeds a predetermined pressure level.

In this system, however, there is a possibility that a side collision is erroneously detected because the pressure in the inner space of the door may become higher than the predetermined level when no side collision occurs. A door of an automobile may be deformed by some other reasons than a side collision because a rigidity of an inner panel of a door is not very high. For example, when an open door is abruptly closed, a pressure in the inner space of the door increases. When a front airbag is inflated, the pressure in the inner space of the door increases. In particular, the pressure increase is predominant when the front airbag is inflated under a condition that all the windows are closed. There is a possibility, in the conventional passenger-protecting system, that a side airbag is unnecessarily inflated based on the pressure increase in the inner space of the door that is caused by reasons other than the side collision.

SUMMARY OF THE INVENTION

The present invention has been made in view of the above-mentioned problem, and an object of the present invention is to provide an improved passenger protecting system, in which unnecessary operation of a passenger-protecting device against a side collision is prohibited.

The passenger-protecting system includes a pressure sensor for detecting a pressure in an inner space of a door (side door) and a side airbag installed in the door. When the pressure in the inner space of the door exceeds a predetermined threshold level, the side airbag is operated (inflated) to protect a passenger from a side collision. However, there are certain situations where the pressure in the inner space increases by other reasons than a side collision. Since the operation of the side airbag is unnecessary under such situations, the operation is prohibited.

The certain situations where the operation of the side airbag is prohibited are: when an action to close the door that has been opened and a front airbag is inflated to protect a passenger. In addition, the operation of the side airbag is prohibited when the door is kept open while the vehicle is not driven. As such, a predetermined on-board device may include a front airbag and doors, the operation of which affects pressure changes in the inner space of the doors.

The prohibition of the operation of the side airbag may be effected by increasing the threshold pressure level to be compared with the pressure in the inner space of the door. It is preferable to prohibit the operation of the side airbag for a certain period after the door-closing action occurred and after the front airbag is inflated. It is also preferable to give a warning to a passenger when the operation of the side airbag is prohibited while the vehicle is being driven.

According to the present invention, the operation of the side airbag is effectively prohibited under situations other than a situation where the side collision has actually occurred. Other objects and features of the present invention will become more readily apparent from a better understanding of the preferred embodiments described below with reference to the following drawings.

BRIEF DESCRIPTION OF THE DRAWINGS

FIG. 3 is a timing chart showing a changeover from a state where operation of a side airbag is prohibited to a state where the operation is permitted in response to an abrupt closing of a door;

FIG. 4 is a timing chart showing a changeover from a state where operation of a side airbag is permitted to a state where the operation is prohibited in response to a signal for inflating a front airbag;

DETAILED DESCRIPTION OF THE PREFERRED EMBODIMENTS

Figure 1:
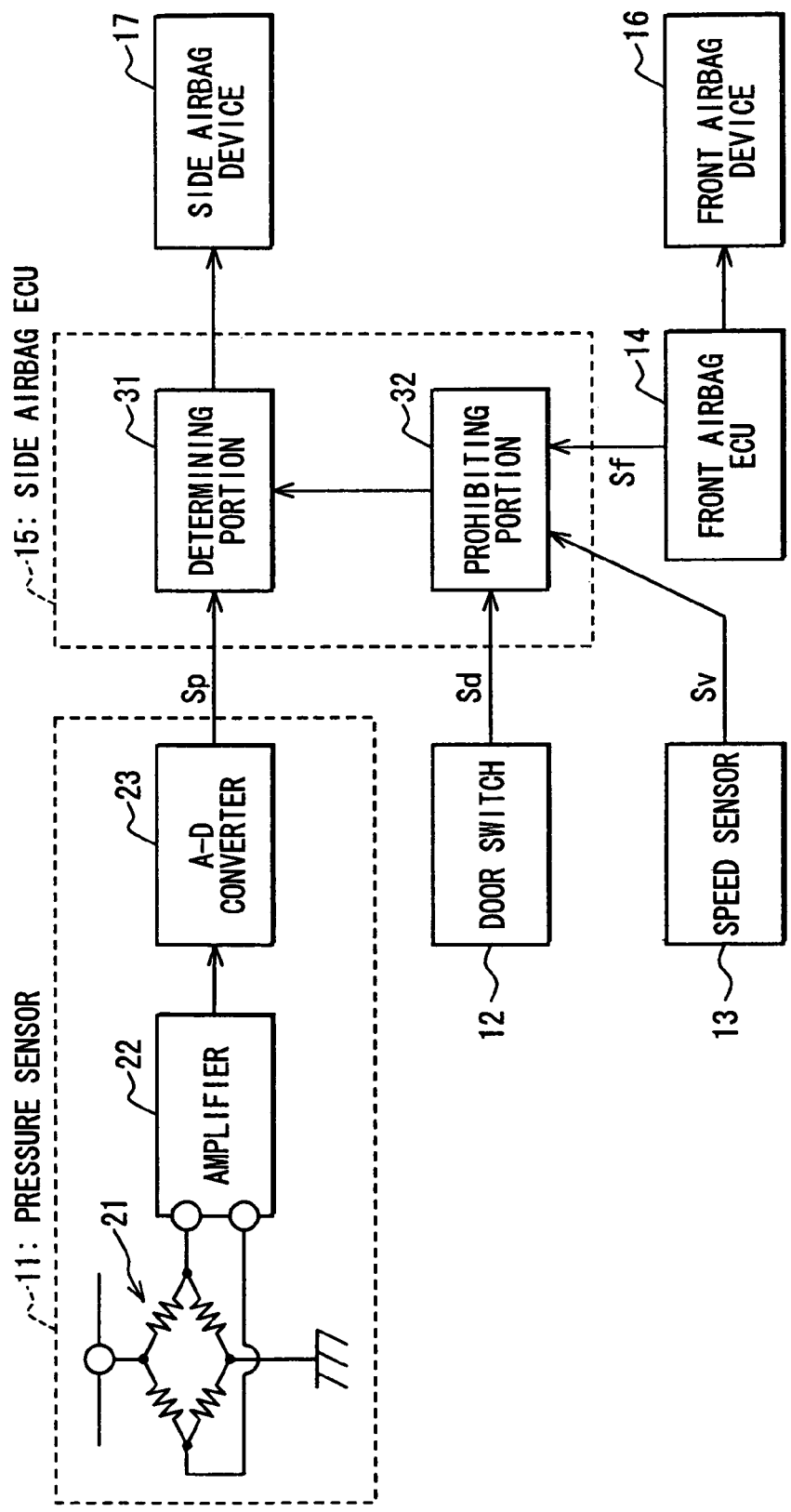
FIG. 1 is a block diagram showing an entire structure of a passenger-protecting system for an automobile as a first embodiment of the present invention.

A first embodiment of the present invention will be described with reference to FIGS. 1-4. First, referring to FIG. 1, an entire structure of a passenger-protecting system will be described. The passenger-protecting system is composed of a pressure sensor 11, a door switch 12, a speed sensor 13, a front airbag ECU 14, a side airbag ECU 15, a front airbag device 16 and a side airbag device 17.

The pressure sensor 11 is positioned in an inner space in a door (a side door). The inner space is formed between an inner panel and an outer panel. The pressure sensor may be fixed to an inner panel, for example. The pressure sensor 11 detects a pressure in the inner space. The pressure sensor 11 is composed of a sensor chip 21, an amplifier 22 and an analog-digital converter 23. The sensor chip 21 is made of a silicon chip. A thin diaphragm is formed at a center portion of the silicon chip, and dispersed resistors constituting a Wheatstone bridge are formed on the thin diaphragm. Upon applying a pressure on the thin diaphragm, a voltage across a pair of output terminals of the Wheatstone bridge changes.

The output voltage of the sensor chip 21 is fed to the amplifier 22 for amplifying the voltage fed thereto. Then, the amplified voltage is converted from an analog voltage to a digital signal (referred to as a pressure signal Sp) by the analog-digital converter 23. The presssure signal Sp representing the pressure detected by the sensor chip 21 is fed to a determining portion 31 in the side airbag ECU 15. The door switch 12 is a switch for detecting whether a door is open or closed. The door switch outputs an OFF signal when the door is open and an ON signal when the door is closed. The outputs of the door switch 12 are referred to as a door signal Sd. The speed sensor 13 outputs a speed signal Sv representing a driving speed of the vehicle.

The front airbag ECU. (Electronic Control Unit) 14 controls operation of a front airbag device 16. That is the front airbag is inflated when a frontal collision is detected based on a vehicle acceleration signal and other signals. The passenger-protecting device for a frontal collision is not limited to the front airbag device though the front airbag is used in this particular embodiment. The front airbag may be installed in a steering wheel of an instrument panel. The front airbag ECU 14 outputs a front airbag signal Sf for inflating the front airbag.

The side airbag ECU 15 that includes a determining portion 31 and a prohibiting portion 32 controls operation of the side airbag device 17 based on the pressure signal Sp, the door signal Sd, the speed signal Sv and the front airbag signal Sf fed to the side airbag ECU 15. The passenger-protecting device against a side collision is not limited to the side airbag though the side airbag is used in this particular embodiment.

The determining portion 31 determines whether the pressure signal Sp exceeds a predetermined threshold pressure Pth. When the pressure signal Sp exceeds the threshold pressure Pth, the determining portion 31 outputs a signal for initiating operation of the side airbag. However, the initiation signal is not outputted when an operation of the side airbag is prohibited by the prohibiting portion 32. When an obstacle hits a door (when a side collision occurs), a pressure in the inner space of the door rapidly increases, and thereby the pressure signal Sp increases. If the pressure signal Sp exceeds the predetermined threshold pressure Pth, it is determined that a side collision occurred.

The prohibiting portion 32 determines whether operation of the side airbag device 17 is permitted or prohibited. If the pressure signal Sp increases by reasons other than the side collision, the operation of the side airbag device 17 is prohibited. The process of prohibiting the operation of the side airbag will be explained in detail with reference to FIG. 2.

At step S1, whether the vehicle speed Sv detected by the speed sensor 13 is higher than a predetermined threshold speed Vth is determined. Whether the vehicle is driving or not may be determined at this step. If the vehicle speed Sv is higher than Vth, the process proceeds to step S2, where the operation of the side airbag is permitted. In this situation, the side airbag is freely operated if the pressure signal Sp is higher than the threshold pressure Pth without being prohibited by other factors. Then, the process comes to the end (return).

If the vehicle speed Sv is lower than the threshold speed Vth, the process proceeds to step S3, where whether the door is open or not is determined based on the door signal Sd. If the door is open, the process proceeds to step S4, where the operation of the side airbag is prohibited. In this case, the side airbag is not operated even if the pressure signal Sp exceeds the predetermined pressure Pth. Situations where the operation of the side airbag is prohibited at step S4 include a situation where a passenger is getting in or off the vehicle and a situation where the vehicle is being loaded or unloaded. Under these situations, it is not necessary to operate the side airbag. On the other hand, it is necessary to operate the side airbag when the side collision occurs under a situation where the door is open while the vehicle is being driven (e.g., driving with a door half-open). Since the operation of the side airbag is not prohibited when the vehicle speed Sv is higher than Vth (at steps S1 and S2), the side airbag is surely operated under this situation.

If it is determined at step S3 that the door is not open (closed), the process proceeds to step S5, where whether an action for closing the open door occurred is determined based on the door signal Sd. If the action of closing the open door occurred, the process proceeds to Step S6, where the operation of the side airbag is prohibited. Then, at step S7, whether a first predetermined period T1 has lapsed after the door is closed is determined. The prohibition of the operation of the side airbag continues until the first period T1 lapses, and after T1 has lapsed, the process proceeds to step S2, where the operation of the side airbag is permitted. Then the process comes to the end. It is possible that the pressure in the inner space of the door increases and exceeds the threshold pressure Pth upon a closing action of the door. In this case, the operation of the side airbag is not necessary. Therefore, such unnecessary operation is prohibited for the first predetermined period T1.

If it is determined at step S5 that the action to close the open door has not occurred (the door is continuously closed), the process proceeds to step S8, where whether the operation of the front airbag is initiated or not is determined based on the front airbag signal Sf. If the operation of the front airbag is initiated, the process proceeds to step S9, where the operation of the side airbag is prohibited. Then, the process proceeds to step S10, where whether a second predetermined period T2 has lapsed after the operation of the front airbag is initiated is determined. After the second period T2 has lapsed, the process proceeds to step S2, where the operation of the side airbag is permitted. This means that the operation is permitted after it is prohibited for the second period T2. Then, the process comes to the end. Upon operation of the front airbag (upon inflation), a pressure in the passenger compartment increases, and this results in an increase in the pressure (Sp) in the inner space of the door. The pressure Sp may exceed the threshold pressure Pth. Even if Sp exceeds Pth under this situation, the operation of the side airbag is prohibited for the second period T2. In this manner, unnecessary operation of the side airbag is avoided.

If it is determined that the front airbag is not operated at step S8, the process proceeds to step S2, where the operation of the side airbag is permitted. Then, the process comes to the end. This means that the side airbag is operated if Sp exceeds Pth under a situation where the door is not open, an action to close the open door does not occur, and the front airbag is not operated.

With reference to FIG. 3, a timing of changing over the prohibition state to the permission state of the operation of the side airbag in response to the action to close the open door will be explained. FIG. 3(a) shows a timing when the door signal Sd is switched from OFF to ON (the action to close the open door occurred). As shown in FIG. 3(b), the pressure signal Sp representing the pressure in the inner space of the door increases in response to the timing when the door is closed. As shown in FIG. 3(c), the operation of the side airbag is prohibited until the first predetermined period T1 lapses after the door is closed. The operation of the side airbag is permitted after the period T1 has lapsed. This means that an unnecessary operation of the side airbag responsive to the pressure increase due to an abrupt closing of the door is avoided.

With reference to FIG. 4, a prohibiting timing of the operation of the side airbag in response to the operation of the front airbag will be explained. FIG. 4(a) shows a timing when an initiation signal for operating the front airbag is generated. In response to the operation (inflation) of the front airbag, the pressure signal Sp in the inner space of the door increases because the passenger compartment pressure increases when the front airbag is inflated, as shown in FIG. 4(b). The operation of the side airbag, which has been permitted, is prohibited when the signal for initiating the operation of the front airbag is generated. This prohibiting period lasts for the second predetermined period T2, and after the period T2 has lapsed the operation of the side airbag is again permitted, as shown in FIG. 4(c).

The process of prohibiting the operation of the side airbag explained above can be summarized as follows. When the vehicle speed Sv is lower than the predetermined threshold speed Vth (e.g., when the vehicle is not driven), the operation of the side airbag is prohibited even when the pressure signal Sp exceeds the predetermined threshold pressure Pth under the following conditions: when the door is open; when the open door is abruptly closed; or when the front airbag is operated. In this manner, unnecessary operation of the side airbag is avoided.

The prohibiting process of the first embodiment described above may be variously modified. For example, the prohibition of the operation of the side airbag may be effected by changing the level of the predetermined threshold pressure Pth that is compared with the pressure signal Sp in the determining portion 31. More particularly, at steps 34 and S6 shown in FIG. 2, the prohibition may be effected by increasing the threshold pressure Pth to Pth1. Thus, the side airbag is not operated unless the pressure signal Sp exceeds Pth1 that is higher than Pth.

In the second embodiment, the operation of the second airbag is prohibited at least for a certain period irrespective of the amount of the pressure signal Sp under the following conditions: when the door is open; when the action of closing the door is performed; or when the front airbag is operated. Thus, unnecessary operation of the side airbag is avoided. Further, in this embodiment, a warning is given to the passenger when the operation of the side airbag is prohibited if the vehicle speed Sv is higher than the threshold speed Vth.

An increase in pressure signal Sp due to the action of abruptly closing the door is considered lower than the pressure increase due to a side collision. Therefore, it is possible to set Pth1 to a level that can be exceeded by Sp when the side collision occurs but cannot be exceeded by Sp when the abrupt closing action of the door occurs. Accordingly, when the abrupt closing of the door and the side collision occur at the same time, the side airbag is operated while it is not operated when only the action for abruptly closing the door occurs.

Figure 2:
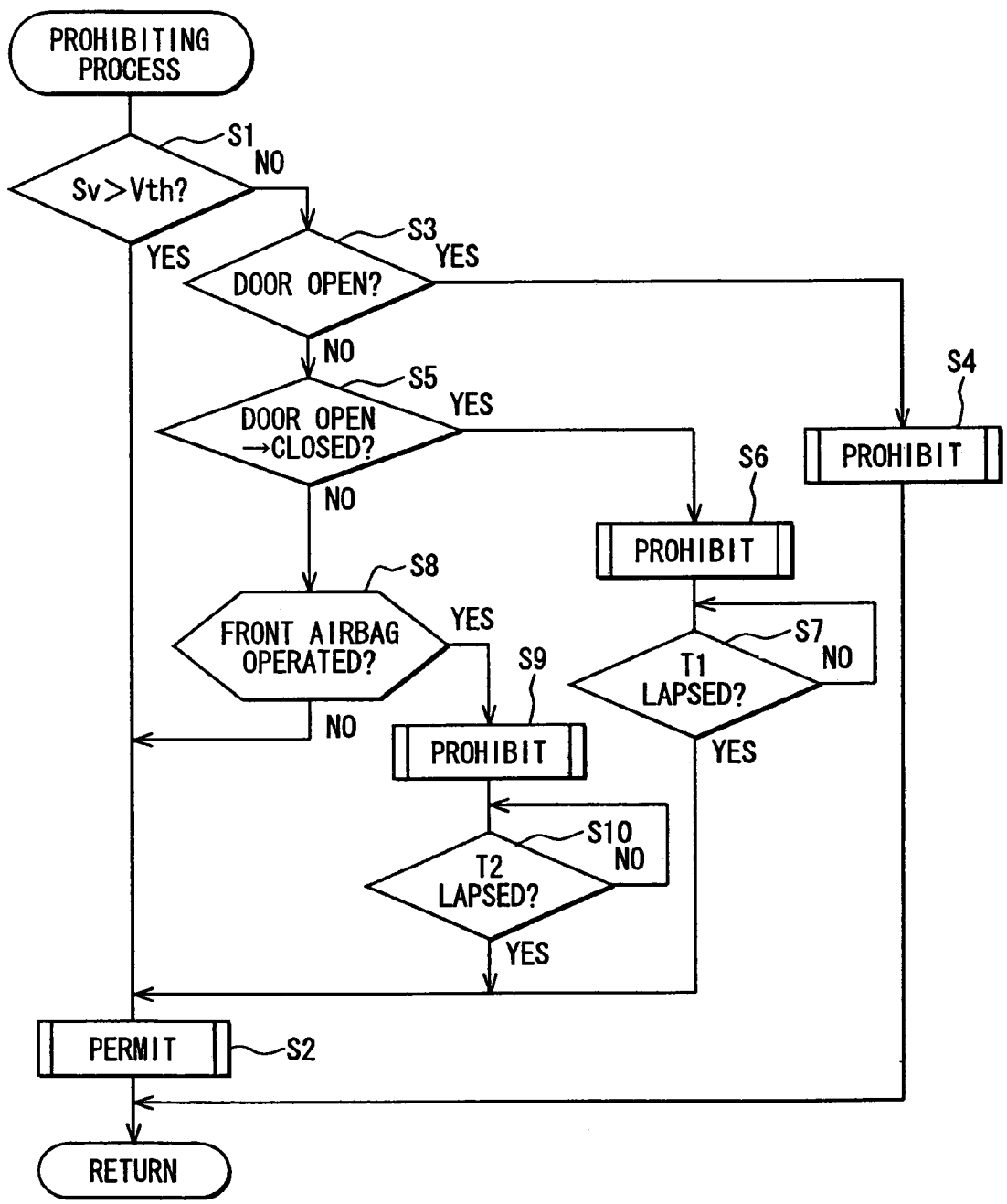
FIG. 2 is a flowchart showing a process for prohibiting operation of a side airbag performed in the first embodiment.

Further, the prohibition may be effected at step S9 shown in FIG. 2 by increasing the threshold pressure Pth to Pth2. Thus, the side airbag is not operated unless the pressure signal Sp exceeds Pth2 that is higher than Pth. An increase in pressure signal Sp due to operation of the front airbag is considered lower than the pressure increase due to a side collision. Therefore, it is possible to set Pth2 to a level that can be exceeded by Sp when the side collision occurs but cannot be exceeded by Sp when the front airbag is operated. Accordingly, when the operation of the front airbag and the side collision occur at the same time, the side airbag is operated while it is not operated when only the front airbag is operated. The threshold pressures Pth1 and Pth2 may be set to respective levels different from each other.

Figure 5:
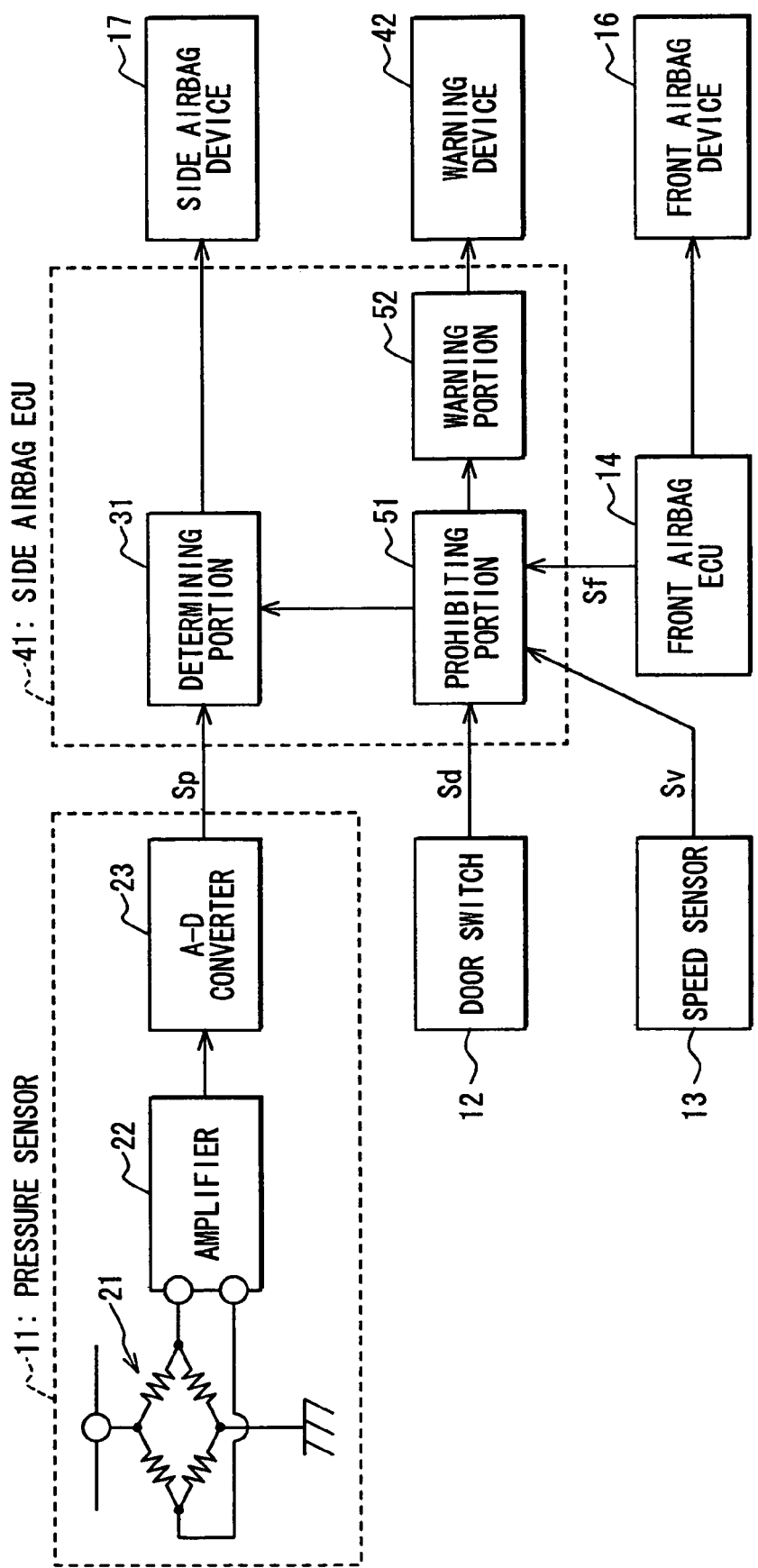
FIG. 5 is a block diagram showing an entire structure of a passenger-protecting system for an automobile as a second embodiment of the present invention.

A second embodiment of the present invention will be described with reference to FIGS. 5 and 6. As shown in FIG. 5, a side airbag ECU 41 includes a warning portion 52 in addition to a prohibiting portion 51. A warning device 42 is additionally used in this embodiment. Other structures are the same as those of the first embodiment described above. The prohibiting portion 51 requests the warning portion 52 to output a signal for operating the warning device 42. Upon receipt of such a signal, the warning device 42 is operated. The warning device 42 may be a device for displaying a warning and/or a warning lamp.

Figure 6:
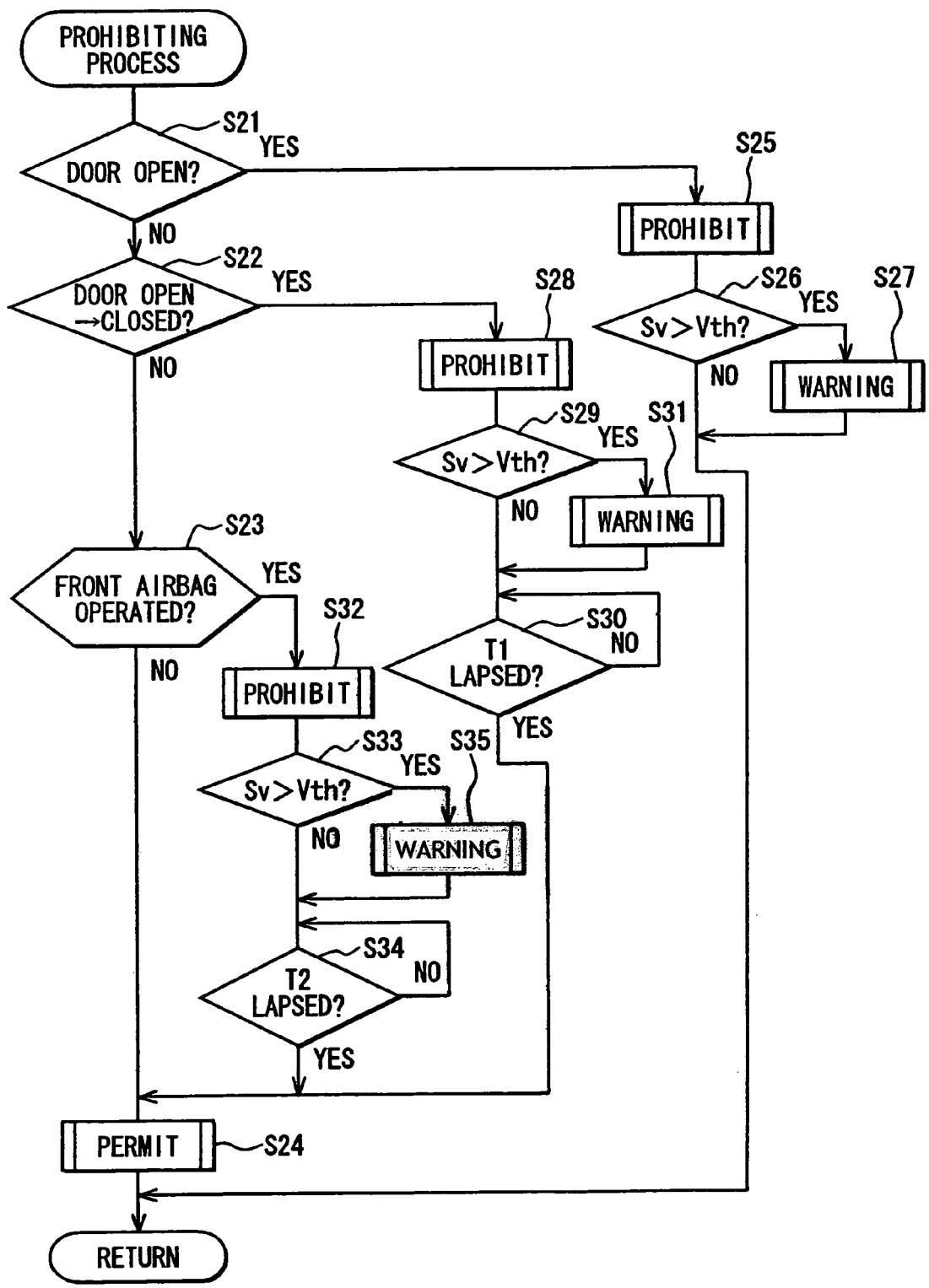
FIG. 6 is a flowchart showing a process of prohibiting operation of a side airbag performed in the second embodiment.

With reference to FIG. 6, a process of prohibiting operation of the side airbag, which is performed in the second embodiment, will be described. At step S21, whether the door is open or not is determined based on the door signal Sd. If the door is not open, the process proceeds to step S22, where whether an action to close the open door is carried out or not is determined based on the door signal Sd. If the action to close the door is not carried out, the process proceeds to step S23, where whether the front airbag is operated (inflated) or not is determined based on the signal Sf. If the front airbag is not operated, the process proceeds to step S24, where the operation of the side airbag is permitted. This means that the side airbag is operated, under this condition, when the pressure signal Sp exceeds the predetermined threshold pressure Pth. Then, the process comes to the end (return).

If it is determined that the door is open at step S21, the process proceeds to step S25, where the operation of the side airbag is prohibited even when the signal pressure Sp exceeds the threshold pressure Pth. Then, process proceeds to step S26, where whether the speed signal Sv exceeds the threshold speed Vth is determined. If Sv is higher than Vth, the process proceeds to step S27, where a warning is given to a passenger by means of a warning display or a warning sound. Then, the process comes to the end (return). If Sv is lower than Vth, the process directly comes to the end without giving the warning.

If it is determined that the door is not open at step S21 and that the action to close the door is carried out at this moment at step S22, the process proceeds to step S28, where the operation of the side airbag is prohibited. Then, the process proceeds to step S29, where the speed signal Sv is compared with the threshold speed Vth. If Sv is higher than Vth, the process proceeds to step S31, where the warning is given. Then, the process proceeds to step S30. If Sv is lower than Vth, the process directly proceeds to step S30. At step S30, whether the first predetermined period T1 has lapsed from the time when the action to close the door is carried out. The prohibition is maintained for the period T1, and then the process proceeds to step S24, where the operation of the side airbag is permitted. Then, the process comes to the end.

If it is determined that the action to close the door is not performed at step S22, the process proceeds to step S23, where whether the front airbag is operated or not is determined. If the front airbag is operated, the process proceeds to step S32, where the operation of the side airbag is prohibited. Then at step S33, the vehicle speed signal Sv is compared with the predetermined threshold speed Vth. If Sv is higher than Vth, the process proceeds to step S35, where the warning is given. Then, the process proceeds to step S34. If Sv is lower than Vth, the process directly proceeds to step S34. At step S34, whether the second predetermined period T2 has lapsed from the time when operation of the front airbag is initiated is determined. During the period T2 the prohibition state is maintained. After T2 has lapsed, the process proceeds to step S24, where the operation of the side airbag is permitted. Then the process comes to the end.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A passenger-protecting system for an automotive vehicle, comprising:
   a pressure sensor for detecting a pressure in an inner space of a door;
   a device for protecting a passenger from a side collision, the device being operated when the inner space pressure exceeds a predetermined threshold level;
   means for prohibiting operation of the passenger-protecting device when a predetermined operation of a predetermined on-board device, an operation of which affects the pressure in the inner space of the door detected by the pressure sensor, is detected;
   a speed sensor for detecting a driving speed of the automotive vehicle; and
   a warning device that gives a warning when the operation of the passenger-protecting system is prohibited and the driving speed exceeds a predetermined speed.

2. A passenger-protecting system for an automotive vehicle, comprising:
   a pressure sensor for detecting a pressure in an inner space of a door;
   a device for protecting a passenger from a side collision, the device being operated when the inner space pressure exceeds a predetermined threshold level;
   means for prohibiting operation of the passenger-protecting device when a predetermined operation of a predetermined on-board device is detected;
   a speed sensor for detecting a driving speed of the automotive vehicle; and
   a warning device that gives a warning when the operation of the passenger-protecting system is prohibited and the driving speed exceeds a predetermined speed.

3. The passenger-protecting system as in claim 2, wherein:
   the prohibiting means elevates the threshold level when a predetermined operation of a predetermined on-board device is detected.

4. The passenger-protecting system as in claim 3, wherein:
   an amount of the threshold level elevated is preset for each predetermined operation of each predetermined on-board device.

5. The passenger-protecting system as in claim 2, wherein:
   the prohibiting means prohibits operation of the passenger-protecting device when a predetermined operation of a predetermined on-board device is detected and the driving speed is lower than a predetermined speed.

6. The passenger-protecting system as in claim 2, wherein:
   the prohibiting means prohibits operation of the passenger-protecting device for a predetermined period after a predetermined operation of a predetermined on-board device is detected.

7. The passenger-protecting system as in claim 6, wherein:
   the predetermined period is preset for each predetermined operation of each predetermined on-board device.

8. The passenger-protecting system as in claim 2, wherein:
   the predetermined on-board device is a device for protecting a passenger from a frontal collision; and the predetermined operation is an operation of the device for protecting a passenger from a frontal collision.

9. The passenger-protecting system as in claim 2, wherein:
   the predetermined on-board device is a door of the automotive vehicle; and the predetermined operation is an action to close the door that has been opened.

10. The passenger-protecting system as in claim 2, wherein:
    the predetermined on-board device is a door of the automotive vehicle; and the predetermined operation is an action for keeping the door open.

11. The passenger-protecting system as in claim 2, wherein:
    the predetermined on-board device is a front airbag; and the predetermined operation is an action for inflating the front airbag.

12. The passenger-protecting system as in claim 2, wherein:
    the device for protecting a passenger from a side collision is a side airbag.

* * * * *